United States Patent [19]

Tajiri et al.

[11] Patent Number: 4,797,561
[45] Date of Patent: Jan. 10, 1989

[54] READING APPARATUS WITH IMPROVED PERFORMANCE

[75] Inventors: Hiromitsu Tajiri; Yasuo Nishiguchi; Chiaki Matsuyama, all of Kagoshima, Japan

[73] Assignee: Kyocera Corporation, Kyoto, Japan

[21] Appl. No.: 901,898

[22] Filed: Aug. 28, 1986

[30] Foreign Application Priority Data

Aug. 31, 1985 [JP] Japan .................. 60-192360
May 30, 1986 [JP] Japan .................. 61-127010
Jun. 9, 1986 [JP] Japan .................. 61-134155

[51] Int. Cl.$^4$ ............................................. H01J 40/14
[52] U.S. Cl. ........................... 250/578; 358/213.15; 358/213.18
[58] Field of Search ............ 250/211 J, 578; 358/212, 213.11, 213.29, 213.15, 213.18, 167

[56] References Cited

U.S. PATENT DOCUMENTS

| | | | |
|---|---|---|---|
| 3,949,162 | 4/1976 | Malveg | 358/213.18 |
| 4,011,442 | 3/1977 | Engeler | 358/213.15 |
| 4,079,422 | 3/1978 | Anagnostopoulos | 358/213.18 |
| 4,413,188 | 12/1983 | Ozawa et al. | 250/578 |
| 4,419,696 | 12/1983 | Hamano et al. | 250/578 |
| 4,424,590 | 1/1984 | Ozawa et al. | 358/213 |
| 4,495,523 | 1/1985 | Ozawa | 358/213 |
| 4,511,804 | 4/1985 | Ozawa | 250/578 |
| 4,556,910 | 12/1985 | Tisue | 358/212 |
| 4,566,040 | 1/1986 | Ozawa | 358/213 |
| 4,673,821 | 1/1987 | Morita | 250/578 |

OTHER PUBLICATIONS

Contact-Type Linear Sensor Using Amorphous Si Diode Array Japanese Journal of Applied Physics, vol. 22 (1983) Supp 22-1, pp. 457–460, Kiyoshi Ozawa, et al.
Amorphous Silicon Image Sensor Electronics Dec. 1982, pp. 59–62 (together with its partial English translation)–Takashi Ozawa.

Primary Examiner—Edward P. Westin
Assistant Examiner—Khaled Shami
Attorney, Agent, or Firm—Spensley Horn Jubas & Lubitz

[57] ABSTRACT

A parallel circuit which is composed of a plurality of series circuits connecting photodetectors to reading switches in series is connected to an input terminal of an operational amplifier. Both a feedback switch and a feedback capacitor are connected in parallel to the operational amplifier. The reading switches and the feedback switches are turned on/off alternately, and then an output of the operational amplifier associated with the operation of reading switches turned on its input to one of input terminals of a differential amplifier, and the output of the operational amplifier associated with the operation of the reading switches turned off is input to the other input terminal of the differential amplifier to obtain the reading signal with noise absorbed.

5 Claims, 9 Drawing Sheets

Fig. 2
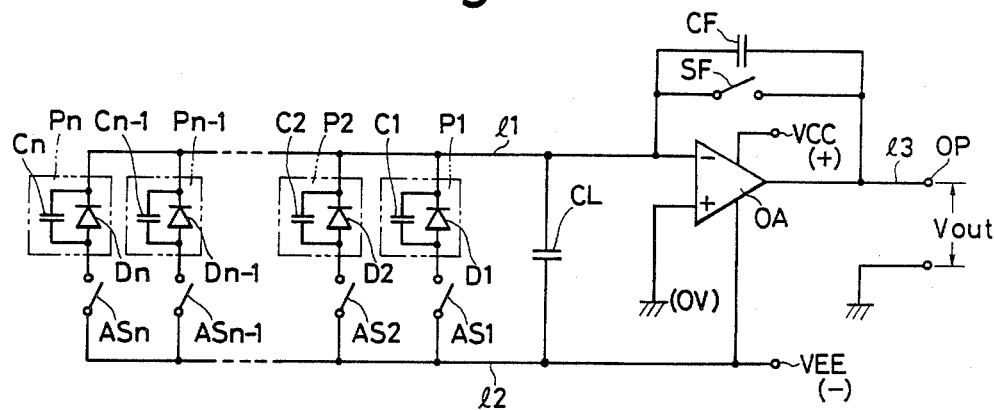
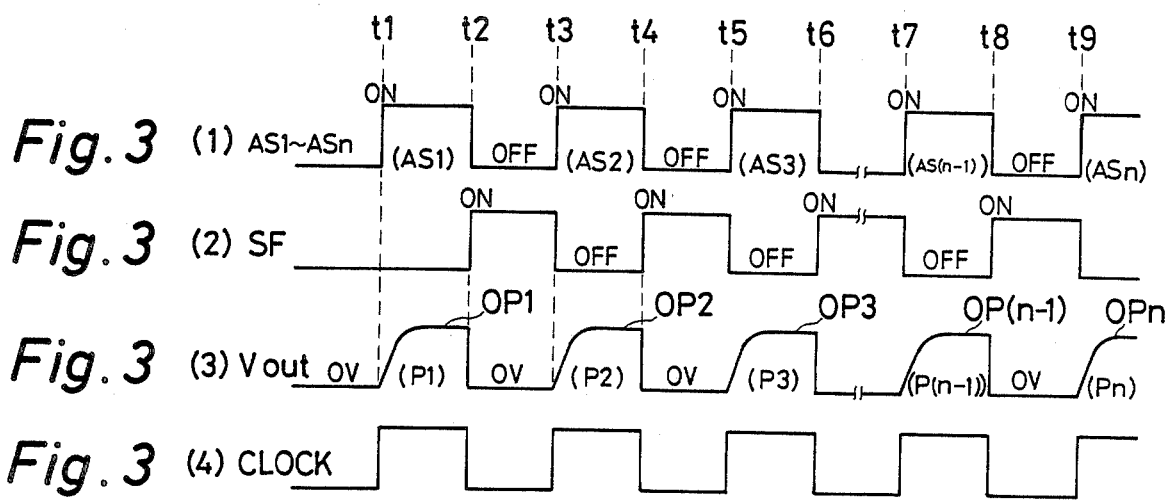

READING APPARATUS WITH IMPROVED PERFORMANCE

BACKGROUND OF THE INVENTION

1. Field of the Invention

The present invention relates to a reading method for reading a document or the like by using plural photodetectors.

2. Description of the Prior Art

A prior art relating to this invention is shown in an electric circuit diagram shown in FIG. 1. Photo detectors P1, P2, P3, ..., Pn are respectively composed of parallel circuits which are composed of photodiodes D1, D2, D3, ..., Dn and electric charge storage capacitors C1, C2, C3, ..., Cn, wherein a specified quantity of electric charge is charged into these electric charge storage capacitors C1 to Cn from a bias power supply VB, and stored therein. When, for example, photodiode D1 receives light reflected from a document, the electric storage capacitor C1 discharges its stored charge corresponding to the exposed quantity, and when a individual reading switch AS1 composed of electronic switch such as analog switch is closed, the electric charge storage capacitor C1 is recharged with an electric charge corresponding to the discharged electric charge, and according to the movement of the electric charge due to this recharging, the voltage generated at output resistance RO is led out into output terminal OP through coupling capacitor CO, thereby, the document being read. Incidentally, capacitors CS1 to CSn shown in FIG. 1 are input capacities connecting respectively to individual reading switches AS1 to ASn, whereas capacitor CL is described below.

In the above electric circuit, the individual reading switches are opened and closed sequentially in time series by a switch driving circuit 10 for reading realized, for example, by shift register, and the output signals from photodetectors P1 to Pn are sequentially led out into the output terminal OP through line 151 which makes up a common electrode commonly connecting the terminals at one end of individual photodetectors P1 to Pn.

According to this prior art, the number n of photodetectors is extremely great, for example, 1,000 to 3,000 are needed even on the shorter side of A4 or B4 (Japanese Industrial Standard) format document, and since these elements are connected in parallel, the capacitance possessed by other (n−1) elements affects one element, and, as the whole, between line 151 and line 152 forming common electrodes as shown in FIG. 1 have a parallel element capacity indicated by CL. As a result, when one individual reading switch is turned on, the recharging current flows in also from the parallel element capacity CL, so that the stored charge in the electric charge storage capacitors C1 to Cn are decreased. Therefore, the output signal intensity led out into the output terminal OP is lowered, which produced a problem of relative deterioration of signal to noise ratio.

Besides, since output resistance RO is used for picking up output, a differential circuit is formed by the output resistance RO and said capacitor capacity, whereby the output signal is made up a narrow diferenial waveform, making it necessary to install a shaping circuit to expand the pulse length in the later stage, which complicated the circuitry. Yet, the reading speed cannot be raised over the time constant determined by said capacitance and output resistance RO, which was a bottleneck for high speed reading.

To alleviate the abovementioned effects of such parallel element capacity CL, in the prior art, it was attempted to divide the common electrode into multiple sections (for example, 27 to 30 pieces in A4 size), and assemble the photodetectors into the groups corresponding to the number of divisions of the common electrode. However, to divide the common electrode into such a multiplicity further complicated the entire structure of the reading element and added to the manufacturing cost, while it also gave rise to the problem of deterioration of signal to noise ratio by interference of noise due to crossing and nearing of the common electrode lines and other signal lines.

Furthermore, an array of photoluminescence (such as LED array) disposed corresponding to the array of photodetectors is not uniform in the intensity of illumination in all elements, and this discrepancy of illumination resulted in uneven output voltages in the photodetector array.

In addition, when mass producing such reading devices, it is hard to attain a unifprm light receiving sensitivity characteristic in the individual photodetector arrays, and the receiving sensitivity differed among individual reading devices.

SUMMARY OF THE INVENTION

It is a primary object of the present invention to provide a newly improved reading method.

It is an another object of the invention to provide a reading method enhanced in the signal to noise ratio by eliminating the effects of parallel element capacity existing parallel to the photodetectors.

It is a still another object of the invention to provide a reading method capable of reading at high speed.

It is a further object of the invention to prvide a reading method capable of correcting the dispersion of illumination of photoluminescence arrays and also correcting dispersion of light receiving sensitivity among photodetector arrays.

It is a still further object of the invention to provide a reading method in simple structure.

In order to accomplish the above-mentioned object, a reading method according to the invention comprises composing a series circuit of a photodetector and switches for individual reading connected in series with the photodetector, the photodetector having an element which has an impedance corresponding to receiving light, and an electric charge storage capacitor connected in parallel with the element, connecting a plurality of the series circuits in parallel to be a first parallel circuit, connecting the parallel circuit to one of input terminals of an operational amplifier, connecting in parallel a second parallel circuit including a capacitor for feedback and a switching element for feedback to one of the input terminals and the output terminal in the operational amplifier, and turning on/off the switching elements for individual reading selectively, the switching elements for feedback being turned off when the switching elements for individual reading are turned on, and the switching elements for feedback being turned on when the switches for individual reading are turned off.

In a preferred embodiment, the photodetectors are divided into a plurality of groups, an output of the operational amplifier associated with groups including the conducted switching elements for individual reading is connected to one of the input terminals of a differential amplifier, and output of the operational amplifier associated with residual groups is connected to the other input terminal of the differential amplifier.

According to the invention, since the effects of the parallel element capacity connected parallel to the photodetectors are eliminated, an output signal waveform broad in pulse length and enhanced in the signal to noise ratio may be obtained. In addition, a reading method capable of reading at high speed and simple in structure may be realized.

Further, according to the invention, wherein an operational amplifier is connected to the output terminal of photodetector circuit, and an integrator composed of parallel circuit of feedback capacitor and feedback switch and a hold circuit are connected to the feedback loop thereof, an output signal of a broad pulse length is obtained, and since the effects of parallel element capacity are eliminated, the number of photodetectors that can be connected to one common electrode may be increased, and high speed reading is realized at the same time. Moreover, since the in-phase noise components included in the output signal are removed through a differential amplifier, an output waveform of high quality enhanced in the signal to noise ratio is obtained, which contributes ro the improvement of the reading precision. Since the number of divisions of common electrode is reduced to a minimum limit, the number of mountable photodetectors may be increased, and a large capacity sensor main body is realized and the production cost may be lowered, too.

A reading method according to a further aspect of the invention comprises:

composing a series circuit of a photodetector and switches for individual reading connected in series with the photodetector, the photodetector having an element which has an impedance corresponding to receiving light, and an electric charge storage capacitor connected in parallel with the element, connecting a plurality of the series circuits in parallel to be a first parallel circuit, connecting the parallel circuit to one of input terminals of an operational amplifier, connecting in parallel a second parallel circuit including a capacitor for feedback and a switching element for feedback to one of the input terminals and the output terminal in the operational amplifier, and turning on/off the switching elements for individual reading selectively, thereunder the switching elements for feedback being turned off when the switching elements for individual reading are turned on, and the switching element for feedback being turned on at least one time until the next switching element for individual reading are turned on, thereby an individual reading signal being obtained;

wherein switching elements and capacitors for absorbing noise are connected in series with one of the input terminals of the operational amplifier, and the switching elements for absorbing noise are switingoperated to lead out spike noise generated when the switching elements for feedback are turned on to the capacitors for absorbing noise.

According to this invention, as the effects of the parallel element capacity existing parallel to the photodetectors are eliminated, a signal output waveform broad in pulse length and improved in signal to noise ratio is obtained, and high speed reading is realized at the same time. In addition, since ringing does not occur, a reading method capable of obtaining a noiseless output voltage waveform is realized.

Thus, according to the reading method of this invention, wherein capacitors and switching elements for absorbing noise are connected in series to the input side of the operational amplifier and the spike noise generated at the time of conduction of switching element for feedback is led out to this noise absorbing block, the S/N ratio and resolution of the reading signal may be enhanced, and since ringing does not occur at the output side of the operational amplifier, it doew not oscillate itself, so that high speed reading may be realized.

A reading method according to a yet further aspect of the invention comprises:

composing a series circuit of a photodetector and switches for individual reading connected in series with the photodetector, the photodetector having an element which has an impedance corresponding to receiving light, and an electric charge storage capacitor connected in parallel with the element, connecting a plurality of the series circuits in parallel to be a first parallel circuit, connecting the parallel circuit to one of input terminals of an operational amplifier, connecting in parallel a second parallel circuit including a capacitor for feedback and a switching element for feedback to one of the input terminals and the output terminal in the operational amplifier, and turning on/off the switching elements for individual reading selectively, thereunder the switching elements for feedback being turned off when the switching elements for individual reading are turned on, and the switching element for feedback being turned on at least one time until the next switching element for individual reading are turned on, thereby an individual reading signal being obtained;

wherein output voltage of reading signal associated with variable capacity of the capacitor for feedback is adjustable.

Aside from the signal output waveform broad in pulse length and enhanced in signal to noise ratio and high speed reading thanks to the elimination of effects of parallel element capacity existing parallel to the photodetectors, this invention realizes a reading method in which the output voltage is variable.

That is, according to the reading method of this invention, the output voltage may set to a desired level easily only by varying the capacity of the capacitor, so that dispersion of output voltages among photodetectors arrays may be corrected, which makes it possible to present a reading device of high quality and high reliability.

Since a desired output voltage may be set in each photodetector group according to a reading method in which the common electrode of the photodetector arrays is divided, the dispersion in the illumination of photoluminescence arrays may be corrected in each photodetector group, so that the outputs of individual photodetector arrays may be equalized.

A reading method according to a yet further aspect of the invention comprises:

composing a series circuit of a photodetector and switches for individual reading connected in series with the photodetector, the photodetector having an element which has an impedance corresponding to receiving light, and an electric charge storage capacitor connected in parallel with the element, connecting a plurality of the series circuits in parallel to be a first parallel circuit, connecting the parallel circuit to one of input terminals of an operational amplifier, connecting in parallel a second parallel circuit including a capacitor for feedback and a switching element for feedback to one of the input terminals and the output terminal in the operational amplifier, and turning on/off the switching elements for individual reading selectively, thereunder the switching elements for feedback being turned off when the switching elements for individual reading are turned on, and the switching element for feedback being turned on at least one time until the next switching element for individual reading are turned on, thereby an individual reading signal being obtained;

wherein switching elements and capacitors for absorbing noise are connected in series with one of the input terminals of the operational amplifier, the switching elements for absorbing noise are switching-operated to lead out spike noise generated when the switching elements for feedback are turned on to the capacitors for absorbing noise, and output voltage of reading signal associated with variable capacity of the capacitor for feedback is adjustable.

BRIEF DESCRIPTION OF THE DRAWINGS

These and other objects, features and advantages of the invention will become more apparent from the following detailed specification and drawings, in which:

FIG. 2 is a fundamental circuit diagram to explain the operation of one of the embodiments of the invention;

FIG. 3 is a waveform diagram to show a output waveform and a timing chart;

DETAILED DESCRIPTION OF THE PREFERRED EMBODIMENTS

Figure 1:
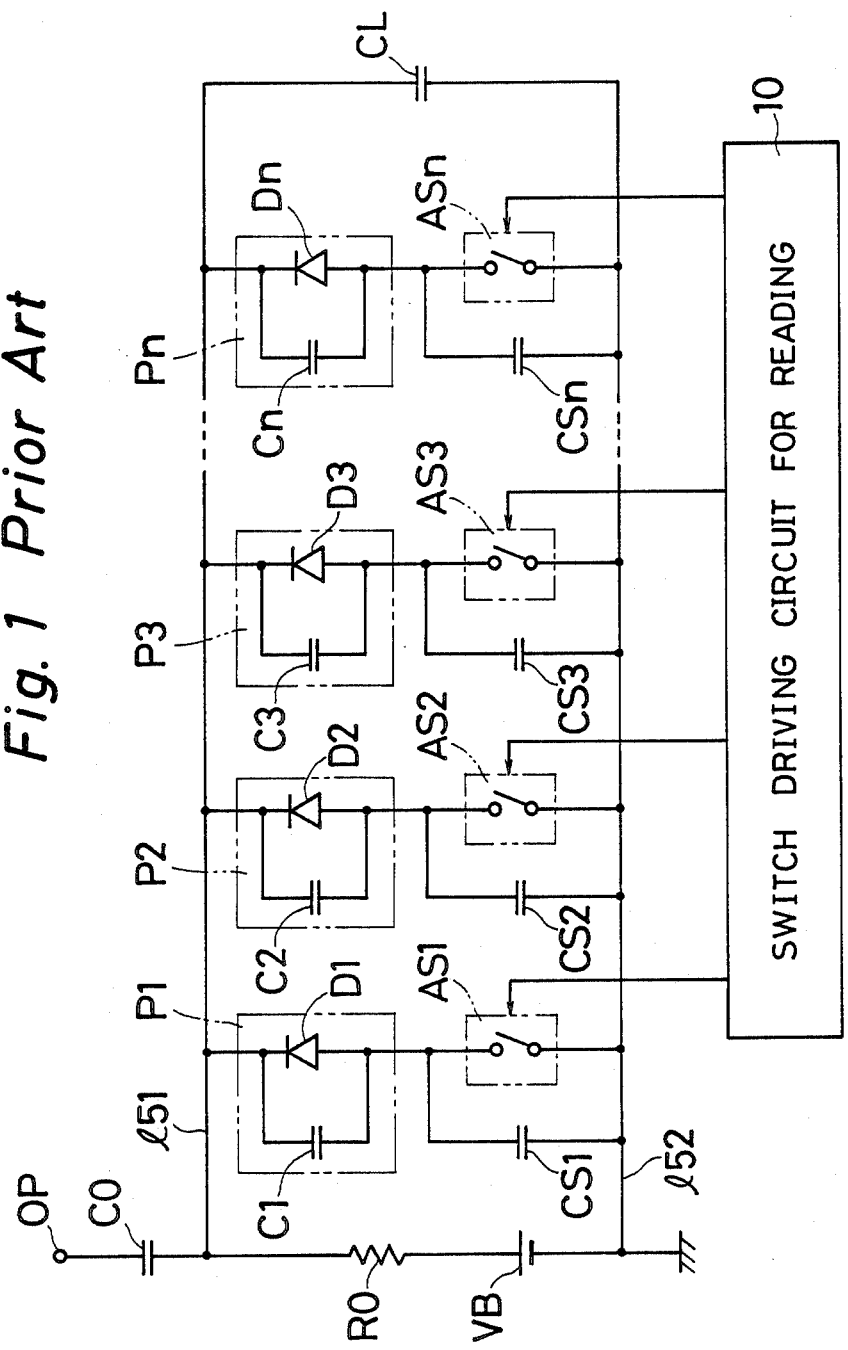
FIG. 1 is an electric circuit diagram showing a prior art of the present invention.

Certain preferred embodiments of this invention are described below while referring to the accompanying drawings.

FIG. 2 is a fundamental circuit diagram to explain the operation of one of the embodiments of this invention.

There are photodiodes D1, D2, ..., Dn, to which are respectively connected electric charge storage capacitors C1, C2, ..., Cn, and a photodector P is formed by a parallel circuit of said photodiode D and electric charge storage capacitor C. One end (the cathode side of photodiode D) of each of photodetectors P1, P2, ..., Pn is commonly connected to line l1 to form a common electrode, which is connected to the inverted input terminal of operational amplifier OA. The other end of each of photodetectors P1 to Pn is individually connected to one of the terminals of reading switches AS1, AS2, ..., ASn realized by electronic switches such as analog switches, while the other terminal of each of reading switches AS1 to ASn is connected to a power supply Vee by way of line l2 to which it is commonly connected. The noninverted input of the operational amplifier OA is grounded, and a parallel circuit made of capacitor for feedback CF and switch for feedback SF interposes between the inverted input terminal and output terminal of the operational amplifier OA, thereby forming an integrator and hold circuit. The output of the operational amplifier is led out to the output terminal OP throgh line l3. The individual electric charge storage capacitors C1 to Cn are charged through the capacitor for feedback CF from the output terminal of the operational amplifier OA when the corresponding reading switches AS1 to ASn are turned on. The capacitance CL interposng between the line l1 and line l2 is a parallel element capacity.

Referring now to the construction shown in FIG. 2, the operation is described below. When photodiode D1 receives a reflected light from, for example, a document, the electric charge storage capacitor C1 discharges an electric charge of $\Delta Q1$ corresponding to the exposed quantity. At this time, the feedback switch SF is in OFF state. When the reading switch AS1 is turned on while the feedback switch SF is in OFF state, an electric charge corresponding to said discharge $\Delta Q1$ moves to the line l1 side from the output terminal of the operational amplifier OA through the feedback capacitor CF. At the same time, an electric charge moves from said parallel element capacity CL in order to charge the electric charge storage capacitor C1, but since the moving amount of charge of line l1 is equal to $\Delta Q1$, the effect of parallel element capacity CL is ignored.

When the reading switch AS1 is turned on, supposing the change in the potential in line l1 due to said discharge $\Delta Q1$ to be $\Delta V1$, the output voltage Vout of line l3 is expressed in the following equation $$V_{out} = -\frac{\frac{1}{j\omega CF}}{\frac{1}{j\omega Cl}} \cdot \Delta V1 = -\frac{Cl}{CF} \cdot \Delta V1 \qquad (1)$$

and since the feedback switch SF is in OFF state at this time, said output voltage is held in the feedback capacitor CF. Then, when the reading switch AS1 is turned off and the feedback switch SF is turned on, said output voltage Vout held in the feedback capacitor CF is short-circuited and discharged, and the voltage of the output terminal OP is to zero volt. Hereinafter, when the remaining photodetectors P2 to Pn and reading switches AS2 to ASn are similarly scanned in the same procedure and at predetermined timing, an output waveform is obtained as shown in FIG. 3(3). Such specified timing may be provided by, for example, a shift register circuit (not shown) which is operated by a constant clock signal, and by this clock signal, the reading switches AS1 to ASn are sequentially opened and closed, so that the photodetectors P1 to Pn may be scanned.

FIG. 3 is a waveform diagram for showing the waveform of output voltage Vout thus obtained and the timing chart for showing the operation of reading switches AS1 to ASn and feedback switch SF. At time t1, the first reading switch AS1 is turned on, so that an output voltage OP1 is led out into the output terminal OP, as shown in FIG. 3(3), with respect to the first photodetector P1 by the integrating action of the feedback capacitor CF. At time t2, the first reading switch AS1 is turned off, and the feedback switch SF is turned on as shown in FIG. 3(2), when the output voltage OP1 is short-circuited to become zero volt. At the next time t3, when the second reading switch AS2 is turned on, the output terminal OP is supplied with output voltage OP2 with respect to the second photodetector P2 as shown in FIG. 3(3), and when the feedback switch SF is turned on at time t4, the output voltage OP2 goes to zero volt. Thereafter, by the clock signal of predetermined period shown in FIG. ((4), similar scanning operation is sequentially effected on all photodetectors. Thus, in this embodiment, since the output waveform is held by the feedback capacitor CF, the output signal is broad in pulse length, and the output signal processing is extremely simple, without requiring waveform shaping or other circuit in the later stage after the otput terminal OP. In the prior art, as mentioned above, the reading time cannot be shortened because the fall time of output is determined by the time constant of load resistance and parallel element capacity, while in this embodiment there is no output resistance, and the effect of parallel element capacity CL can be ignored, so that the reading time may be shortened. Moreover, the method of division of common electrode to decrease the effects of parallel element capacity CL is not always necessary.

Figure 4:
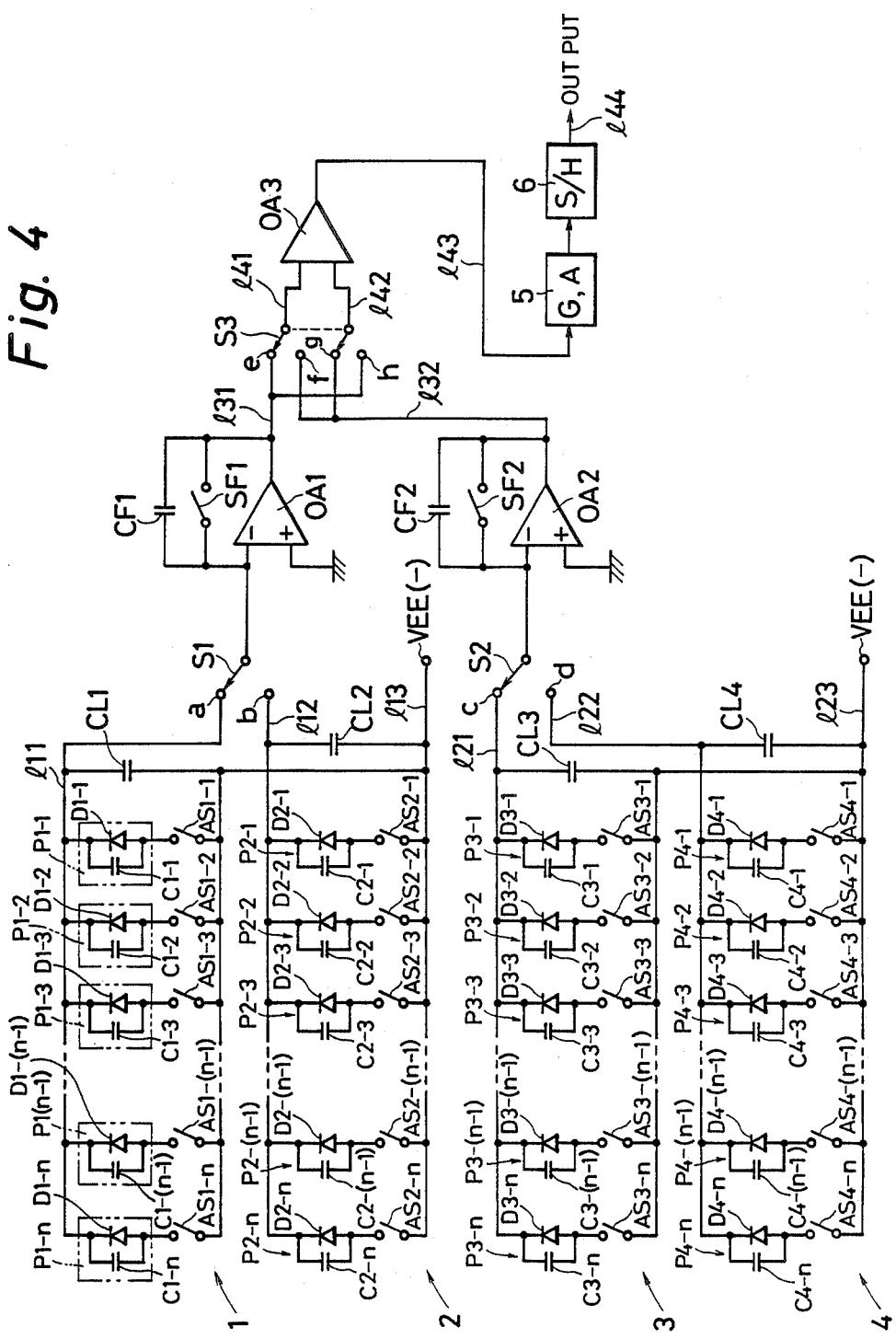
FIG. 4 is an electric circuit diagram of one of the embodiments of the invention.

FIG. 4 is an electric circuit diagram of one of the embodiments of this invention, in which the operation of the individual photodetector circuit groups 1 to 4 is the same as that in the circuit shown in FIG. 2, and the same explanation is avoided here. The first point of note in this embodiment is that two subsystems, each of which includes one of two operational amplifiers OA1, OA2 are used in which the operational amplifier OA1 selects plural, photodetector circuit groups 1, 2 of the first subsystem by a changeover switch S1, and the operational amplifier OA2 selects plural photodetector circuit groups 3, 4 of the second subsystem by a changeover switch S2. As explained in relation to the fundamental circuit shown in FIG. 2, in this invention, the effect of the parallel element capacity existing parallel to the photodetector circuit can be lowered to an ignorable level and the means to divide the common electrode is not needed, but in this embodiment, the common electrode is divided into four lines, 111, 112, 121, and 122, by positively making advantage of this merit, and the number of connectable photodetectors is remarkably increased, so that more photodetectors can be connected by a smaller number of common electrodes, as compared with the prior art, thereby realizing a photodetector circuit of large capacity in a simple structure.

The second point of note in this embodiment is that the signal to noise ratio is improved by suppressing the so-called common mode noise (in-phase noise components), by dividing line 131 and line 132 connected to the output terminals of operational amplifiers OA1, OA2 into two branches each and feeding into differential amplifier OA3 by way of the contact of changeover-switch S3. As a result, the noise due to switching of the reading switch is eliminated upon rise and fall of the clock pulse to obtain an output waveform of high quality, so that the reading precision is enhanced.

The operation of this embodiment is explained by referring to the construction shown in FIG. 4. The contact of the changeover switch S1 is connected to a and that of changeover switch S2 to c. Two sets of contacts of the changeover switch S3 are respectively connected to e and g. In this state, as explained in relation to the fundamental circuit shown in FIG. 2, scanning is started from photodetector P1-1 of photodetector circuit group 1, of which output signal is fed into one of the input terminals of the differential amplifier OA3 by way of operational amplifier OA1, line 131, and line 141 sequentially. At this time, since line 132 is connected to the other input terminal of the differential amplifier OA3 through the contact g of changeover switch S3, the in-phase noise components contained in the lines 131 and 132 are removed by the differential amplifier OA3, and the scan-reading output of photodetector circuit group 1 being rid of said in-phase noise components and enhanced in the signal to noise ratio is led out into line 143.

When scan-reading of photodetectors P1-1 to P1-n of the photodetector circuit group 1 is over, the changeover switch S1 is changed from contact a to contact b, and the photodetector circuit group 2 is scanned in succession, and an output is led out to the line 144. When scan-reading of the photodetector circuit group 2 is over, the changeover switch S3 is changed from contant e to f, and from contact g to h, and the noise components contained in the reading output signal led out into the line 141 and the noise components contained in the line 142 are removed to eliminate in-phase noise components, then an output is led out into the line 143. When scan-reading of the photodetector circuit group 3 is over, the changeover switch S2 is changed from contact c to d, and the photodetector circuit group 4 is scanned in succession. In this way, all photodetectors P1-1 to P4-n are scanned, and the in-phase noise components contained in the output signals of photodetector groups 1 to 4 are removed.

The changeover switches S1 to S3 are synchronized with the drive signals of reading switches AS1-1, AS1-2, . . . , AS4-n which are connected in series to the photodetectors P1-1, P1-2, . . . ,P4-n respectively, and when scan-reading of one photodetector circuit group is over by the output of counter circuit (not shown) which counts the number (n) of the photodetectors to compose one photodetector circuit group, these switches act to changeover to the next photodetector circuit group. Table 1 shows the photodetector circuit groups 1 to 4 and the positions of contacts of the corresponding changeover switches S1 to S3 in the process of scanning in the embodiment shown in FIG. 4.

TABLE 1

| Photodetector Circuit Group | Positions of Contacts of Changeover Switches | | | |
| --- | --- | --- | --- | --- |
| | S1 | S2 | S3 | |
| 1 | a | c | e | g |
| 2 | b | d | e | g |
| 3 | a | c | f | h |

TABLE 1-continued

| Photodetector Circuit Group | Positions of Contacts of Changeover Switches | | | |
|---|---|---|---|---|
| | S1 | S2 | | S3 |
| 4 | b | d | f | h |

The output signals sequentially led out into the line 143 in this way are led out to the line 144 by way of level adjuster 5 and then sample hold circuit 6.

Thus, by this reading method, since output resistance is not present and the effects of parallel element capacity CL can be ignored, the reading time can be shortened.

Figure 6:
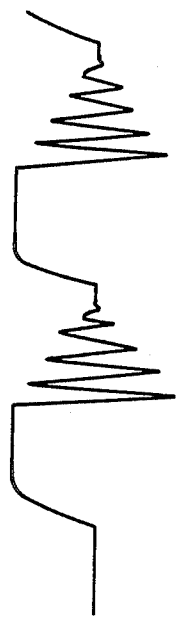
FIG. 6 is a waveform diagram showing a waveform of output including ringing.

Although the excellent performance is realized by this reading method as disclosed herein, when discharging the electric charges held by the feedback capacitor CF between t1-t2, t3-t4, t5-t6, t7-t8, and t9-t10 shown in FIG. 3 through the feedback switch SF, since this discharging time constant is very small, voltage in the input line of the operational amplifier OA fluctuates suddenly. Since the operational amplifier OA cannot follow up this fluctuation, ringing occurs as shown in FIG. 6, which causes to lower the S/N ratio and deteriorate the resolution. Furthermore, when it is attempted to raise the reading speed, the charge of the next reading element is fed into the input line of the operational amplifier OA before this ringing is stabilized, putting the operational amplifier OA in oscillating state, which results in inability of high speed reading.

Figure 5:
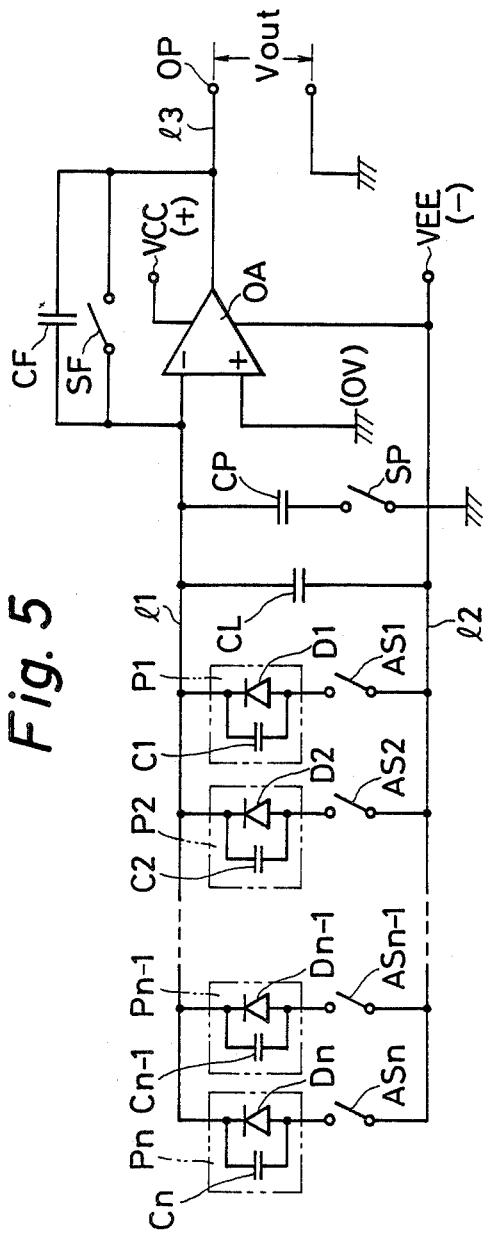
FIG. 5 is a fundamental circuit diagram to explain an operation of another embodiment of the invention.

FIG. 5 is a fundamental circuit diagram for explaining the operation of other embodiment of this invention. As compared with FIG. 2, the different point is that, in the electric circuit shown in FIG. 2, the noise absorbing capacitor CP and noise absorbing switch SP are connected in series to the inverted input terminal of the operational amplifier OA. In FIG. 5, the same parts as in FIG. 2 are identified with same reference numbers.

That is, by operating the electric circuit shown in FIG. 5, the feedback switch SF is made to conduct, and the electric charge held in the feedback capacitor CF is discharged, when the noise absorbing switch SP is made to conduct almost simultaneously. Consequently, the spike noise generated in the input line of operational amplifier OA is led out to the ground side through the noise absorbing capacitor CP, so that this input line may be stabilized, thereby preventing ringing and oscillation of operational amplifier OA as shown in FIG. 6.

Figure 7:
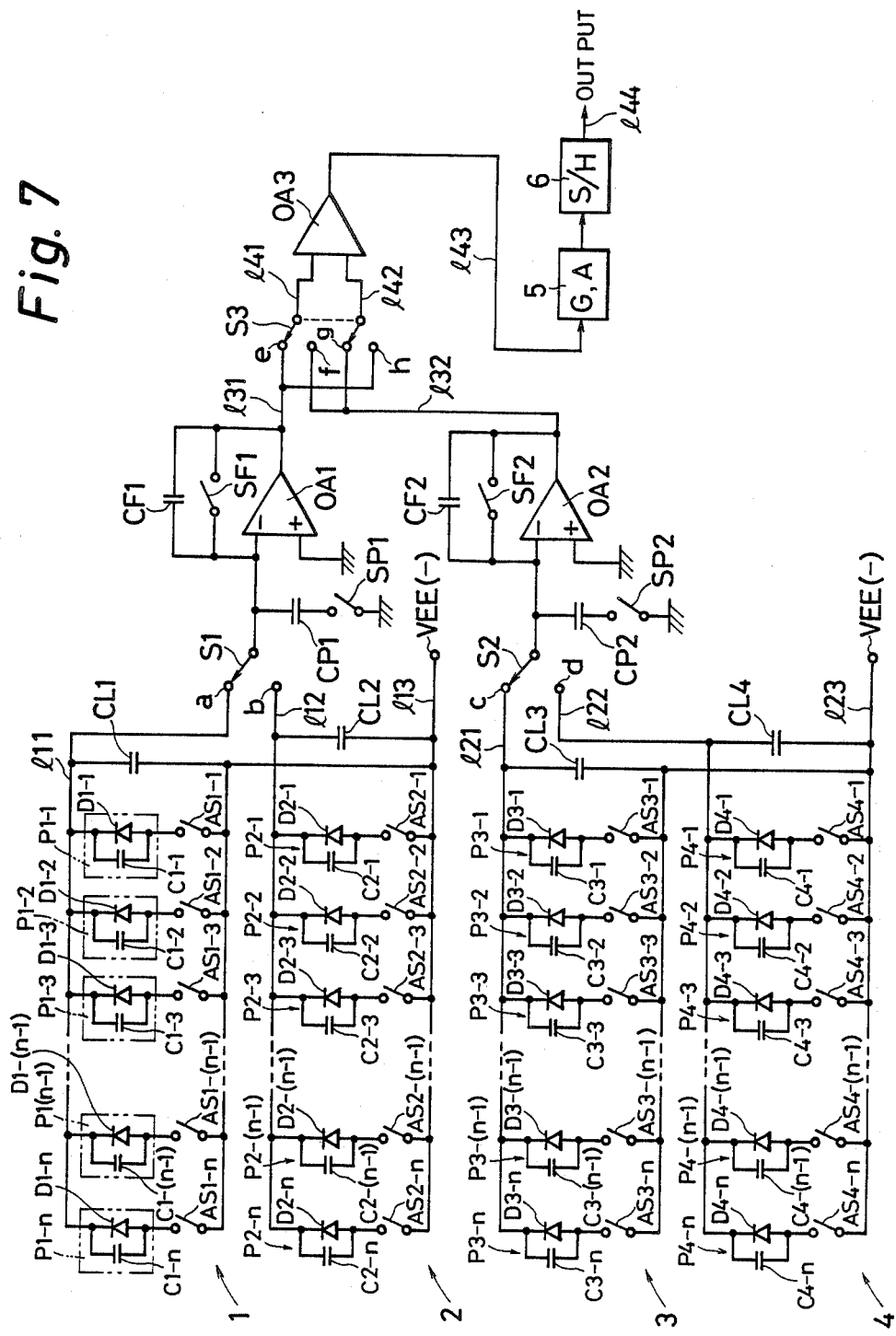
FIG. 7 is an electric circuit diagram to explain a further different embodiment of the invention.

FIG. 7 is an electric circuit diagram for explaining a further different embodiment of this invention.

In FIG. 7, the operation of the photodetector circuit groups 1 to 4 is same as that in the circuit shown in FIG. 4, and the same explanation is omitted here. The first point of note in this embodiment is that two operational amplifiers OA1, OA2 are used, wherein the operational amplifier OA1 selects plural photodetector circuit groups 1, 2 by a changeover switch S1 and the operational amplifier OA2 selects plural photodetector circuit groups 3, 4 by a changeover switch S2. As a result, same as in the embodiment in FIGS. 2 to 4, a photodetector circuit of a large capacity is realized, while simplifying the circuit, by connecting more photodetectors in a smaller number of common electrodes as compared with the related art.

The second point of note in this embodiment is that the signal to noise ratio is enhanced by suppressing the common mode noise (in-phase noise components), by dividing the lines 131 and 132 connected to the output terminals of operational amplifiers OA1, OA2 respectively into two branches each, and feeding them to the differential amplifier OA3 by way of the contact of a changeover switch S3. As a result, eliminating the noise derived from rise and fall of clock pulse and switching of reading switch, an output waveform of high quality is obtained, and the reading precision is improved.

Furthermore in this embodiment, by connecting the noise absorbing capacitors CP1, CP2 and noise absorbing switches SP1, SP2, which are the features of this invention, in series to the operational amplifiers OA1, OA2, respectively, one of the terminals of each of switches SP1, SP2 is grounded.

The operation of this electric circuit is described herein.

The contact of changeover switch S1 is connected to a, and that of changeover switch S2, to c, and two sets of contacts of changeover switch S3 are respectively connected to e and g. In this state, as explained in relation to the fundamental circuit in FIG. 1, first scanning is started from the photodetector P1-1 in the photodetector circuit group 1, of which output signal is fed into one of the input terminals of the differential amplifier OA3 by way of operational amplifier OA, line 131, and line 141, sequentially. At this time, since the other input terminal of the differential amplifier OA3 is connected to the line 132 through the contact g of changeover switch S3, the in-phase noise components included in the lines 131, 132 are removed by the differential amplifier OA3, and the same in-phase noise components are eliminated also from the line 143, so that the scan-reading output of the photodetector circuit group 1 enhanced in signal to noise ratio is led out.

When scan-reading of the photodetectors P1-1 to P1-n of the photodetector circuit group 1 is over, the changeover switch S1 is changed from contact a to b, and the photodetector circuit group 2 is scanned in succession, and an output is led out into line 144. When scan-reading of the photodetector circuit group 2 is over, the changeover switch S3 is changed from contact e to f, and from contact g to h, and the noise components contained in the reading output signal led out from line 141 and noise components contained in line 142 are removed to eliminate in-phase noise components, and an output is led out into line 143. When scan-reading of the photodetector circuit group 3 is over, the changeover switch S2 is changed from contact c to d, and the photodetector circuit group 4 is scanned in succession. Thus, all photodetectors P1-1 to P4-n are scanned, and the in-phase noise components contained in the output signals of photodetector groups 1 to 4 are removed by the differential amplifier OA3.

The output signals sequentially led out into the line 143 are led out into the line 144 by way of level adjuster 5 and then sample hold circuit 6.

Therefore, also in the electric circuit of this embodiment, noise absorbing capacitors CP1, CP2, and noise absorbing switches SP1, SP2 are used, and hence, for example, when discharging the electric charge held in the feedback capacitor CF1 due to conduction of the feedback switch SF1, by conducting the noise absorbing switch SP1, the spike noise generated in the input line of the operational amplifier OA1 is led out to the ground side by way of the noise absorbing capacitor CP1. Also in the photodetector circuit groups 3,4, the spike noise generated in the input line of the operational amplifier OA2 in the same operation is led out to the ground side through the noise absorbing capacitor CP2.

Thus, ringing does not occur at the output side of the operational amplifiers OA1, OA2, and the operational amplifiers OA1, OA2 do not oscillate at all.

In spite of the excellent characteristics mentioned above, however, in this reading method, the photoluminescence arrays (for example, LED arrays) disposed in correspondence to the photodetector array is not uniform in the intensity of illumination in all elements, and there is dispersion in the illumination, which causes unevenness of the individual output voltages of the photodetector arrays.

When the reading device is mass produced, it is difficult to obtain a uniform light receiving sensitivity characteristic among individual photodetector arrays, and dispersion in the receiving sensitivity occurs among individual reading devices.

Figure 8:
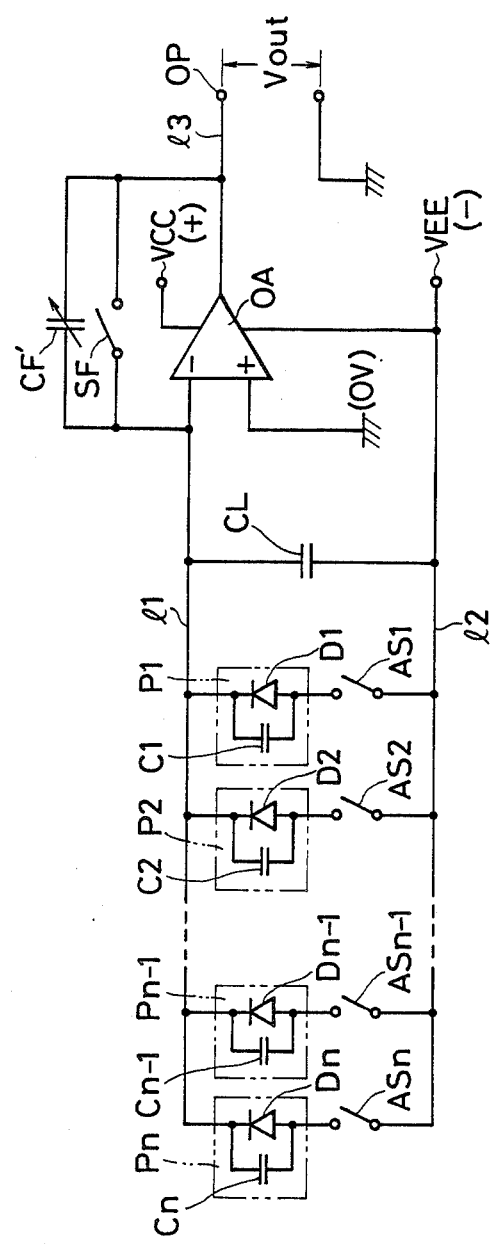
FIG. 8 is a fundamental circuit diagram to explain the operation of a still different embodiment of the invention.

FIG. 8 is a fundamental circuit diagram to explain the operation of a still different embodiment of this invention, and it is one of the features of this invention that the feedback capacitor CF mentioned previously in FIGS. 2, 4, 5, and 7 is replaced by a variable capacitor CF' which is variable in its capacitance. In FIG. 8, the same parts as in FIGS. 2, 5 are identified with same reference numbers.

That is, as mentioned in equation (1) of the embodiment, when the switch AS1 is turned on to read, the output voltage Vout of the operational amplifier OA is expressed as $$V\text{out} = -\frac{Cl}{CF} \cdot \Delta V1 \tag{2}$$

so that the output voltage Vout may be set to a desired level along with the change of the capacity of the variable capacitor CF'. The waveform of thus obtained output voltage Vout is identical with the waveform of the output voltage Vout mentioned in FIG. 5, but the height of its waveform can be adjusted to a desired level.

Figure 9:
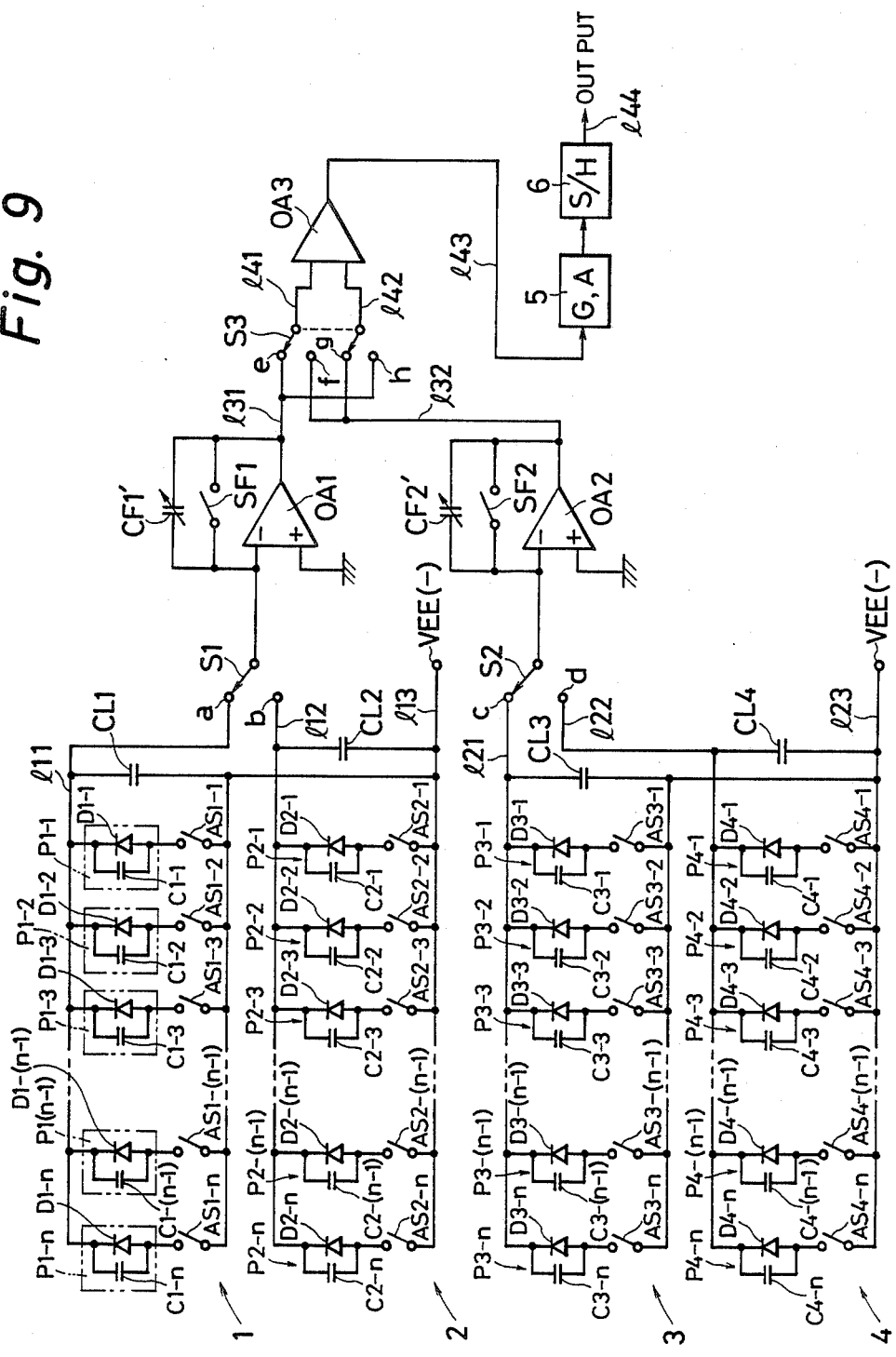
FIG. 9 is an electric circuit diagram to explain another different embodiment of the invention.

FIG. 9 is an electric circuit to explain another different embodiment of this invention.

That is, the individual photodetector circuit groups 1 to 4 in FIG. 9 operate same as in the circuits shown in FIGS. 2, 4, 5, 7, and 8, and the same explanation is omitted here.

What must be noted in this embodiment is that feedback capacitors CF1', CF2', etc. are also used in the electric circuit, so that the output voltage Vout led out to the lines 131, 132 may be varied by changing their capacities. Accordingly, as the common electrode is divided, the output voltage may be set to a desired level, and the dispersion of intensity of illumination of light emitting diode arrays may be adjusted in the individual operational amplifiers, and all output voltages may be equalized.

Figure 10:
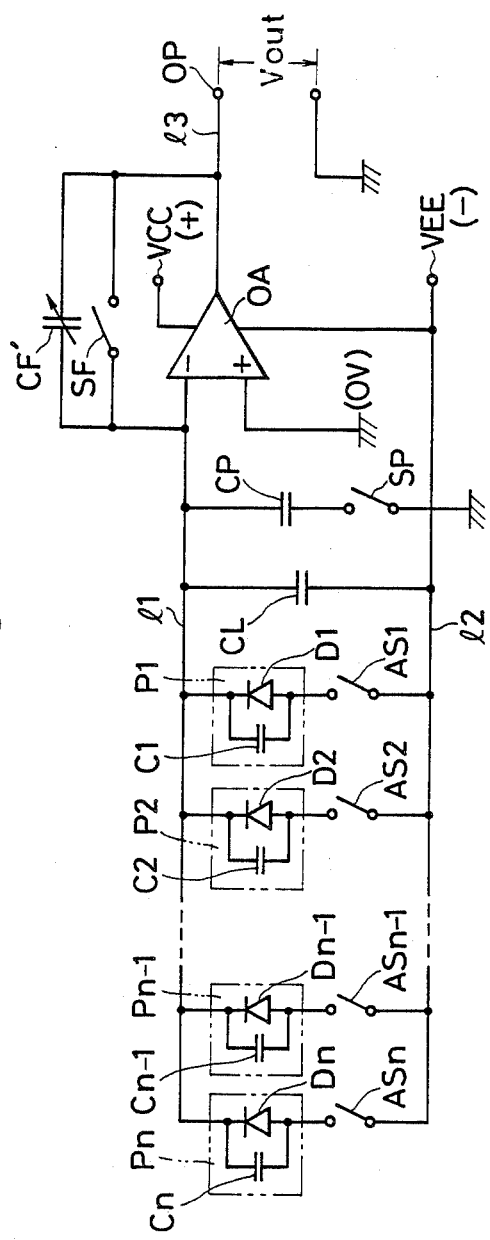
FIG. 10 is a fundamental circuit diagram to explain a further different embodiment of the invention.

FIG. 10 is an electric circuit showing a further different embodiment of the invention. This embodiment is similar to the embodiment shown in FIG. 5 mentioned above. In FIG. 10, the same parts corresponding to parts in FIG. 5 are identified with same reference numbers. It must be noted in this embodiment that the feedback capacitor CF' interposed between the input terminal and the output terminal in the operational amplifier OA is a variable capacitor. The other construction is the same as that in the above mentioned embodiments.

Figure 11:
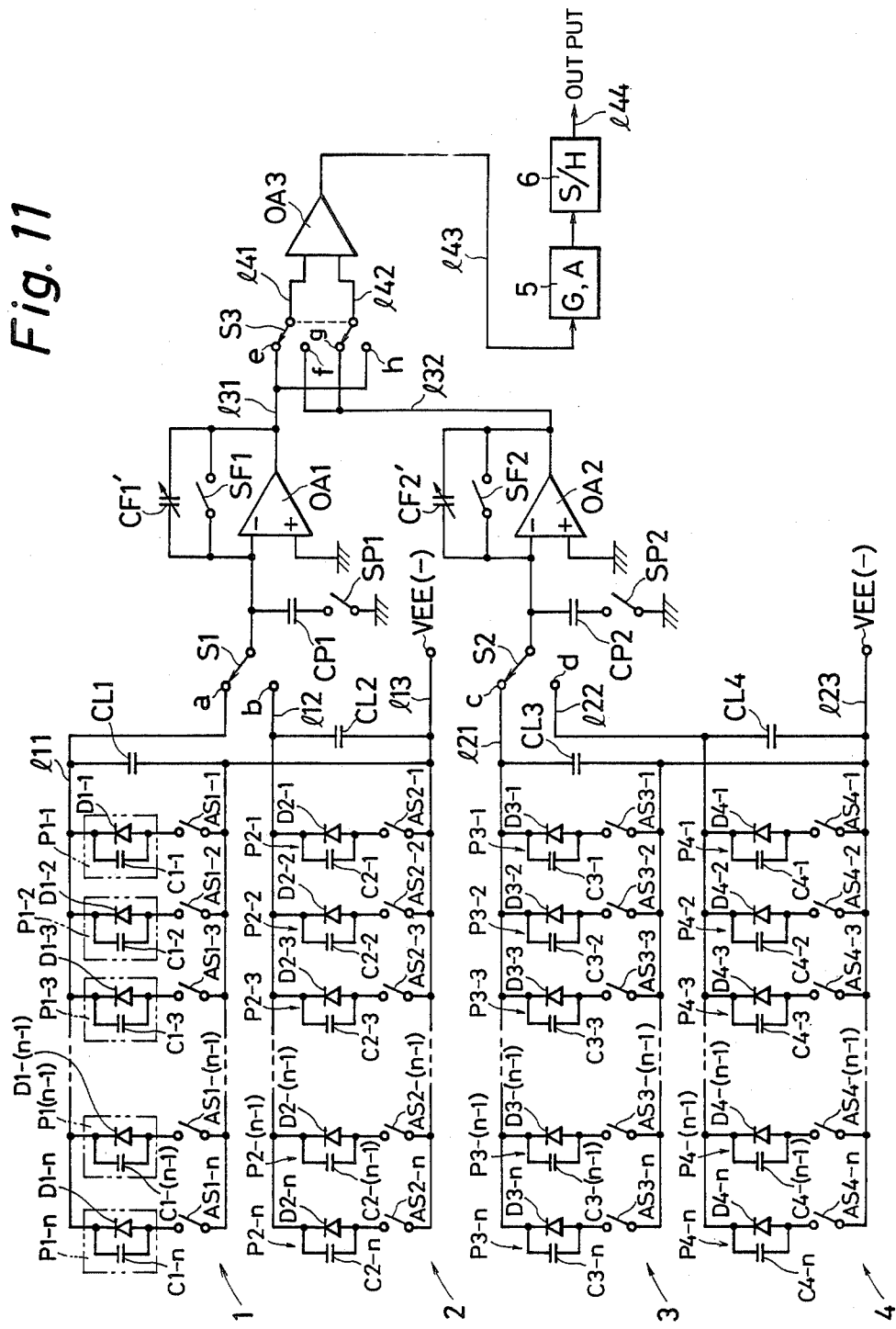
FIG. 11 is an electric circuit diagram to explain a still further different embodiment of the invention.

FIG. 11 is an electric circuit showing a still further different embodiment of the invention. This embodiment is similar to the embodiments shown in FIGS. 7 and 9. In FIG. 11 also, the same parts corresponding to parts in FIGS. 7 and 9 are identified with same reference numbers. What must be noted in this embodiment is that the feedback capacitors CF1' and CF2' connected respectively to the operational amplifiers OA1 and OA2 are variable capacitors. The other construction is the same as that in the above mentioned. It is pointed out that such embodiments shown in FIGS. 10 and 11 also are included within the spirit of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A reading apparatus, comprising:
    a plurality of groups of reading elements wherein each group of reading elements is coupled in parallel to define a common output, wherein each element comprises a photodetector and a reading switch coupled in series with the photodetector and wherein each photodetector comprises a light detecting element having an impedance corresponding to received light and a capacitor coupled in parallel with the light detecting element;
    an operational amplifier having an output;
    switching means for coupling the common output of one group at a time to the operational amplifier input;
    a feedback capacitor coupling the output of the operational amplifier to the input of the operational amplifier;
    a feedback switch coupled in parallel to the feedback capacitor;
    means for selectively switching the reading switches on and off so that one reading switch of a group is turned on at a time to thereby activate the reading elements; and
    means for selectively turning the feedback switch on if the reading switches are off and for turning the feedback switch off when any of the reading switches are on.

2. The reading apparatus of claim 1 wherein the plurality of groups and associated operational amplifier define a subsystem and the apparatus further comprises:
    at least one additional such subsystem;
    a differential amplifier having at least two inputs; and
    second switching means for coupling one input of the differential amplifier to the output of the operational amplifier associated with the group in which the reading elements are activated, and for coupling the other differential amplifier input to the output of the operational amplifier of one of the residual groups.

3. The reading apparatus of claim 1 further comprising a capacitor and a switch series-connected to the operational amplifier input for absorbing noise generated when the feedback switch is turned on.

4. The reading apparatus of claim 1 wherein the feedback capacitor is adjustable so that the output voltage of the operational amplifier is adjustable.

5. The reading apparatus of claim 1 further comprising a capacitor and a switch series-connected to the operational amplifier input for absorbing noise generated when the feedback switch is turned on; and
    wherein the feedback capacitor is adjustable so that the output voltage of the operational amplifier is adjustable.

* * * * *